United States Patent [19]

Henke

[11] 4,182,097
[45] Jan. 8, 1980

[54] MACHINE AND METHOD FOR STACKING HAY

[75] Inventor: Donald L. Henke, Creston, Nebr.

[73] Assignee: Veda, Inc., Long Lake, Minn.

[21] Appl. No.: 794,559

[22] Filed: May 6, 1977

Related U.S. Application Data

[62] Division of Ser. No. 546,385, Feb. 3, 1975, Pat. No. 4,022,004.

[51] Int. Cl.$^2$ .............................................. A01D 91/00
[52] U.S. Cl. ..................... 56/1; 56/DIG. 1; 56/346; 100/35
[58] Field of Search .................... 56/1, 344–350, 56/DIG. 1; 100/35, 65–69; 214/9, 17C; 130/20; 198/508, 747

[56] References Cited

U.S. PATENT DOCUMENTS

| | | | |
|---|---|---|---|
| 3,538,696 | 11/1970 | Carson | 56/350 |
| 3,555,997 | 1/1971 | van der Lely | 100/66 |
| 3,720,052 | 3/1973 | Anderson | 56/346 |
| 3,925,974 | 12/1975 | Bartlett | 56/346 |

FOREIGN PATENT DOCUMENTS

| | | |
|---|---|---|
| 892881 | 2/1972 | Canada. |
| 1215994 | 5/1966 | Fed. Rep. of Germany. |
| 2036546 | 2/1972 | Fed. Rep. of Germany. |

*Primary Examiner*—Peter Feldman
*Attorney, Agent, or Firm*—Burd, Braddock & Bartz

[57] ABSTRACT

A hay stacking machine having a platform for supporting a stack of hay. A radial trough extends from the center to the outer peripheral edge of the platform for accommodating hay being transported to it from a rake pickup. The trough includes a longitudinally extending side wall and a bottom wall which extends laterally to merge with the platform top surface. The bottom wall merges at its forward inner end with a portion of the bottom wall extending upwardly to merge with the platform surface. A portion of the platform surface extends over the vertical wall of the trough and over reciprocating out of phase feed teeth in the bottom wall and vertical wall of the trough. An annular frame extends around the platform and rotates relative thereto. A plurality of upright posts are attached to the annular frame. Compression arms extending to the center of the platform are pivoted on the posts and engage hay located on the platform. The pressure arms moving arcuately engage the hay to sweep it along the platform top surface causing stack of hay to form from the bottom up. The compression arms decrease their pressure on the hay as the arms move upwardly while the total pressure remains substantially constant since the hay increases in weight as it increases in height. The unloading of the platform is accomplished by opening gate sections forming a cage around the stack and tipping the platform rearwardly and downwardly followed by operation of a push-off member which moves from the forward end to the rearward end of the platform.

35 Claims, 21 Drawing Figures

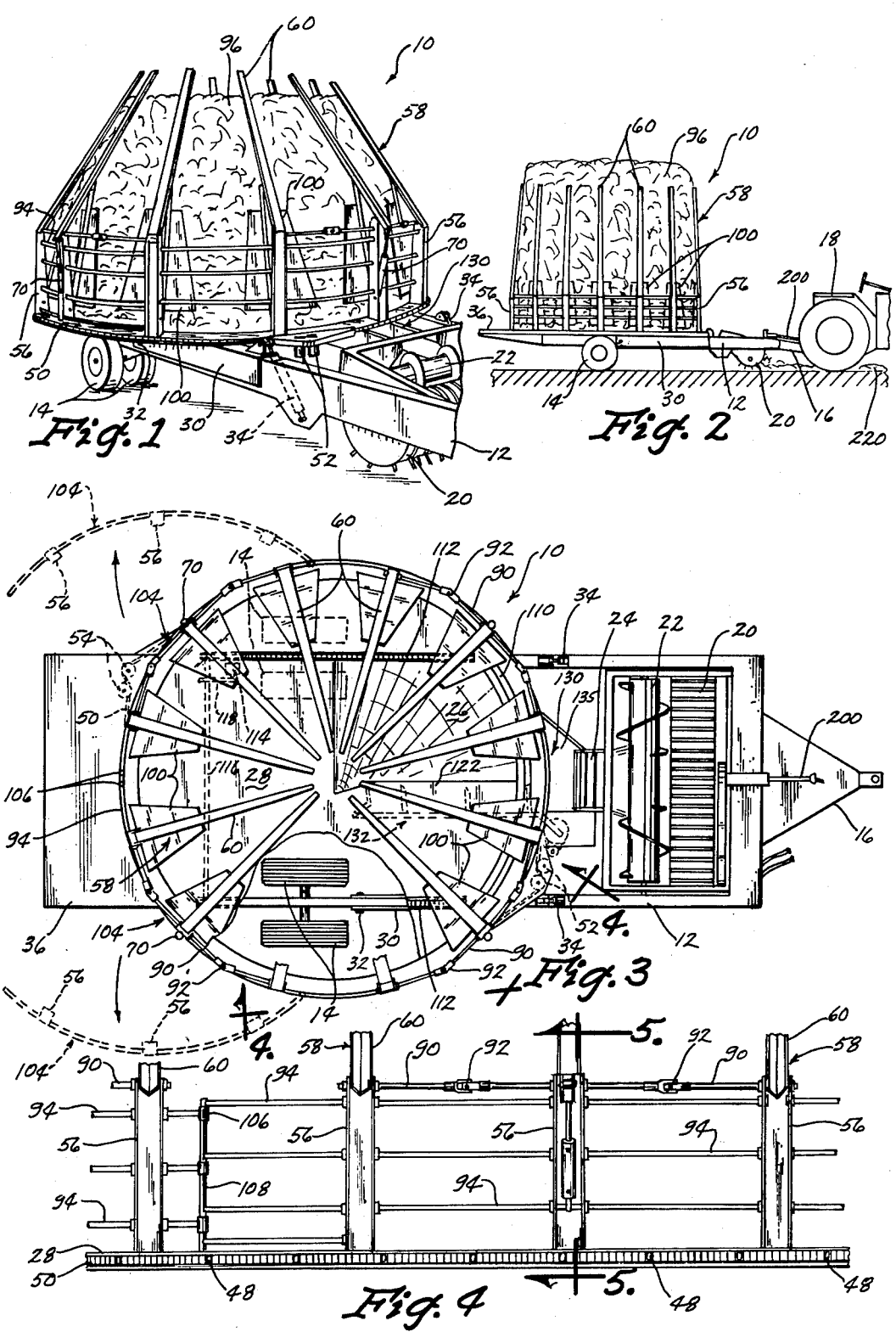

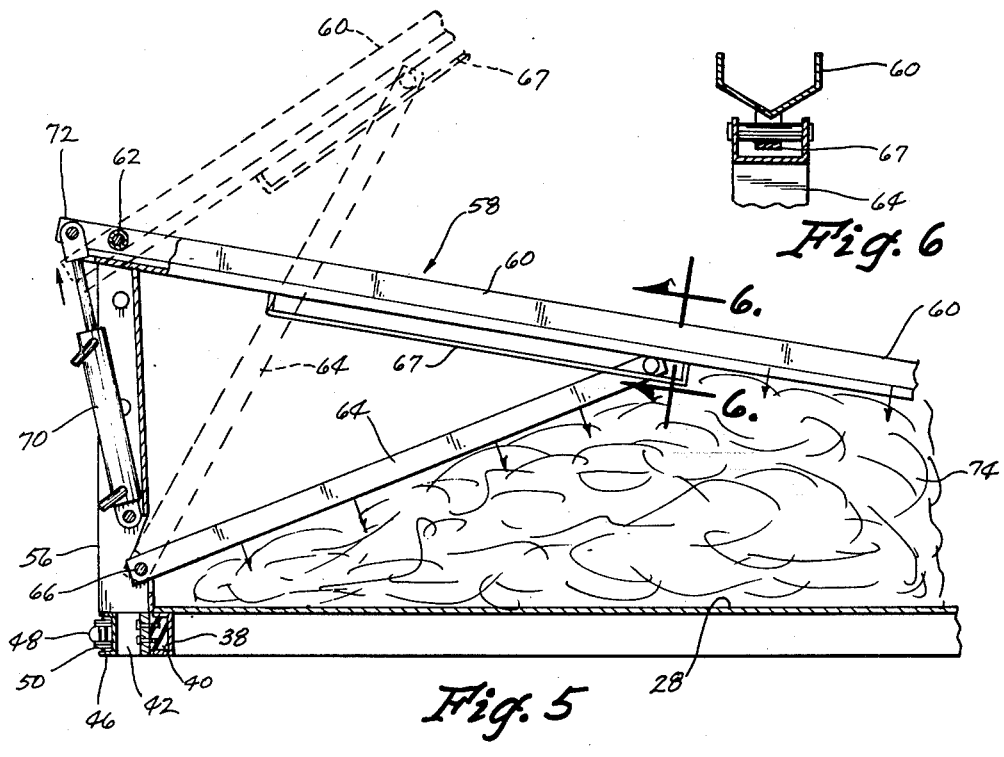
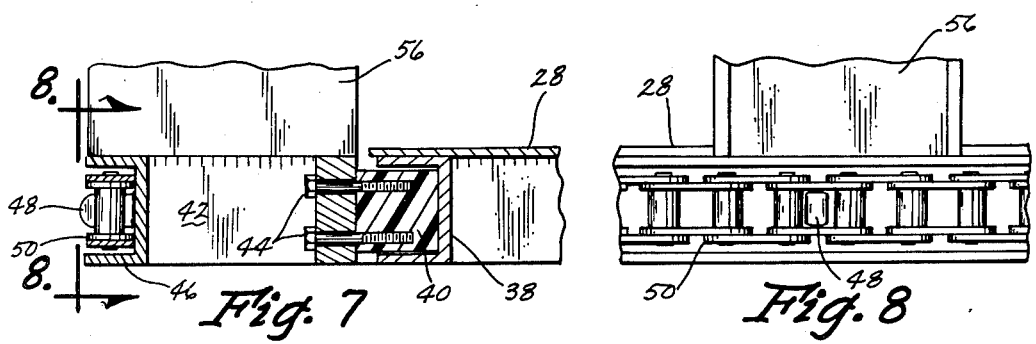
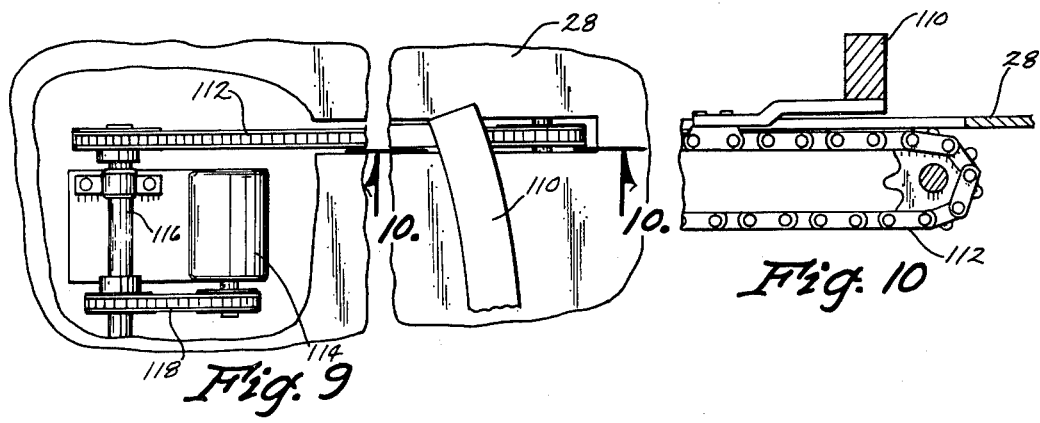

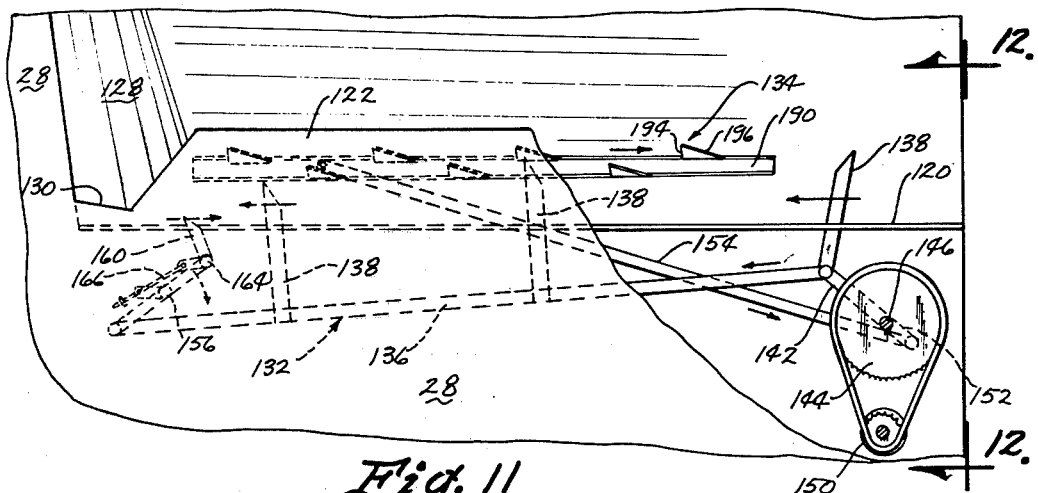

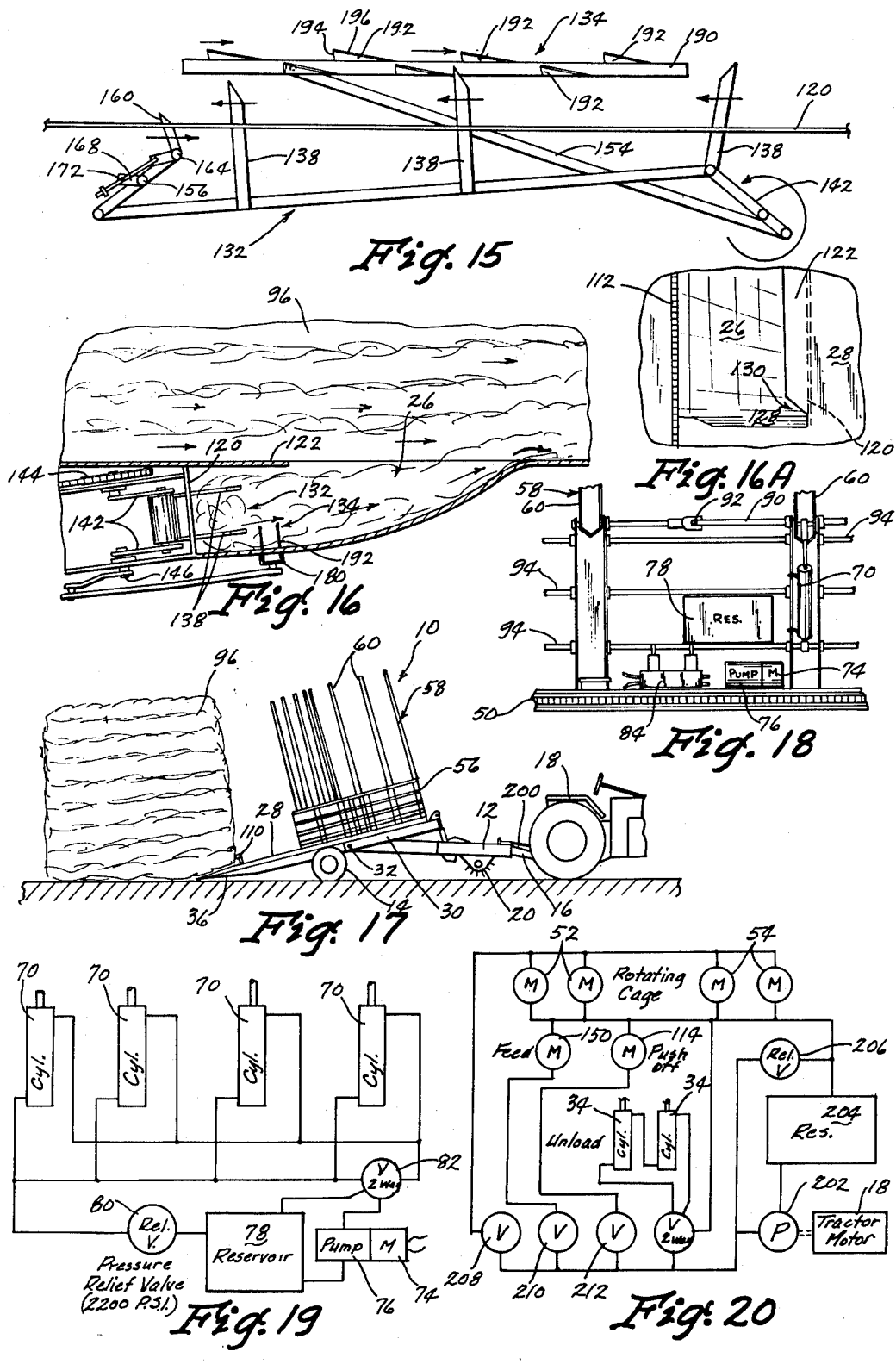

MACHINE AND METHOD FOR STACKING HAY

CROSS REFERENCE TO RELATED APPLICATION

This application is a division of U.S. application Ser. No. 546,385, filed Feb. 3, 1975, now U.S. Pat. No. 4,022,004.

BACKGROUND OF INVENTION

This invention relates to a machine capable of making a stack of hay weighing on the order of six tons and measuring 13 feet in diameter and 13 feet high. In recent years the trend has been toward storing hay in larger units as compared with the smaller bales previously commonplace and capable of being carried by one person. The stack of this invention is intended to remain outside on the ground after being made on a portable platform.

SUMMARY OF INVENTION

In accordance with the present invention a hay stack making machine is provided which picks the hay up off of the ground and feeds it through a compactor to compress and flatten it whereupon it is fed into a trough in the platform where it is then carried by reciprocating vertical and horizontal teeth to the platform surface. A cage located around the platform has a plurality of inwardly and downwardly extending compression arms which engage the hay and cause the hay to turn with the cage and pick up additional hay moving to the platform from the trough and thus allowing the stack to be formed from the bottom up. As the compression arms move to an upwardly extending angular position their downward pressure is reduced however the weight of the stack is increasing thus maintaining the necessary weight on the incoming hay to cause it to continue the stacking operation as the cage is rotated. Upon the stack being completed on the platform the cage is rotated to a position with rearwardly opening gates being at the rear of the platform. A pusher mechanism is actuated which moves from the front edge of the platform to the rear pushing the stack off onto the ground. The platform has been tipped rearwardly and downwardly such that gravity assists in the removal of the stack from the platform. The platform is then returned to the horizontal position as the stacker is moved away from the stack and is now ready to form another stack of hay.

The trough through which the hay moves to reach the platform from the outer peripheral edge is formed by a vertical side wall on one side and a bottom wall which merges into the platform top surface on the other side and at the inner longitudinal end thereof such that the hay moves along a gentle incline plane to the top platform surface. A portion of the platform extends over the vertical wall and by so doing covers vertically and horizontally oriented reciprocating feeding teeth positioned in the trough bottom wall and vertical side wall. A transversely extending notch is provided in the platform wall portion at the longitudinal inner end to allow the hay in its flattened condition to move smoothly onto the platform. The bottom wall of the trough at the inner end includes a portion which extends upwardly to merge with the platform top surface.

The feeder teeth are operated off of a crank such that when the vertically oriented teeth in the trough bottom wall are moving longitudinally forwardly the feeder teeth in the vertical side wall are moving longitudinally rearwardly. The vertical teeth have gripping edges on the forward sides only and the back sides are smooth to allow them to move under the hay on their return stroke. The teeth in the vertical wall are arranged on a member connected to the crank which moves away from the vertical wall and trough on the return stroke or portion of the crank cycle and then moves the teeth into the trough on the feeding portion of the cycle.

A further tooth is provided for extending through the vertical side wall of the trough and this tooth is free to pivot forwardly only thus allowing it to move rearwardly and be folded forwardly by the hay in preparation for its feeding stroke as it moves forwardly.

DESCRIPTION OF DRAWINGS

In the drawings which illustrate an embodiment of the invention:

FIG. 1 is a fragmentary perspective view of the hay stacking machine of this invention.

FIG. 2 is a side elevation view thereof.

FIG. 3 is a top plan view thereof.

FIG. 4 is a cross sectional view taken along line 4—4 in FIG. 3.

FIG. 5 is a cross sectional view taken along line 5—5 in FIG. 4 and illustrates the operation of the compression arms.

FIG. 6 is a cross sectional view taken along line 6—6 in FIG. 5.

FIG. 7 is an enlarged cross sectional view illustrating the rib and groove slidable connection between the cage and the platform.

FIG. 8 is a cross sectional view taken along line 8—8 in FIG. 7.

FIG. 9 is a fragmentary top plan view of the platform illustrating the push-off mechanism.

FIG. 10 is a cross sectional view taken along line 10—10 in FIG. 9.

FIG. 11 is a fragmentary top plan view of the platform illustrating the reciprocating vertical and horizontal feed means.

FIG. 12 is a cross sectional view taken along line 12—12 in FIG. 11.

FIG. 13 is a cross sectional view taken along line 13—13 in FIG. 12.

FIG. 14 is a view similar to FIG. 11 but illustrating the feed means in different positions.

FIG. 15 is a view similar to FIGS. 11 and 14 showing the feeding means in still further positions.

FIG. 16 is a cross sectional view of the platform illustrating the feeding means in the trough leading to the platform.

FIG. 16A is a fragmentary top plan view of the feed trough in the platform.

FIG. 17 is a reduced in scale side elevation view illustrating the unloading of the platform by tipping the platform downwardly and rearwardly.

FIG. 18 is a fragmentary side elevation view illustrating the power system for the compression arms.

FIG. 19 is a schematic view of the power system for the compression arms.

FIG. 20 is a schematic view of the hydraulic system operating the other mechanisms in the hay stacker.

DESCRIPTION OF PREFERRED EMBODIMENT

The hay stacking machine of this invention is referred to generally in FIG. 1 by the reference numeral 10 and is provided with a frame 12 having wheels 14 and a tongue 16 for attachment to a tractor 18. Frame 12 at its forward end carries a pickup rake 20 which feeds hay to a screw conveyor 22 having oppositely disposed flights for moving hay to the center thereof to be fed through a roller compressor 24 just prior to being fed into a feeding trough 26, as seen in FIG. 16A, in a circular table or platform 28.

Platform 28 is carried on frame 12 by side frame members 39 being pivoted at 32 by power cylinders 34 connected to frame 12 such that platform 28 can be tilted between the loading and transport position of FIG. 1 to the unloading position of FIG. 17. An unloading apron 36 is positioned rearwardly of circular platform 28 on which the stack of hay 96 is formed.

Platform 28 in FIGS. 5 and 7 has an annular channel 38 around its outer periphery which slidably and rotatably receives a slide block 40 of plastic material such as Ryerson 12, Ryerson & Sons, Chicago, Illinois. Slide block 40 is attached to an annular cage or frame 42 by bolts 44. An outwardly facing channel 46 is provided on the annular frame 42. A plurality of spaced apart teeth 48 attached to channel 46 engage a drive chain 50. Chain 50 is powered by a pair of hydraulic motors 52 mounted on the front end of platform 28, as seen in FIG. 3, and a pair of drive motors 54 mounted on the rear end of platform 28 to provide continuous rotation of the annular frame 42. Frame 42 supports a plurality of spaced apart upright posts 56. A compression is movably mounted on each post. Each compression arm 58 includes an upper arm 60 pivotally connected with pin 62 to the top of post 56 and a lower arm 64 pivotally connected with pin 66 to post 56 adjacent platform 28. The inner end of lower arm 64 is pivotally and slidably connected to upper arm 60 and moves in a track 67 attached to upper arm 60. Arm 60 is raised and lowered in response to operation of a hydraulic cylinder 70 extending between post 56 and the outer end portion 72 of arm 60. Arm 60 is V-channel shaped in cross section, as seen in FIG. 6, to provide maximum strength with minimum weight. As shown in FIG. 5, the maximum downward pressure on hay 96 on platform 28 occurs when the compression arms 58 are extending generally laterally outwardly. Minimum pressure is applied to hay 96 when the arms 58 are extending substantially upwardly due to the outer end portion 72 being shorter when the compression arms 58 are extending upwardly.

Compression arms 58 are operated by the power cylinders 70, as seen in FIG. 19, which are in a separate system from other operational systems of the hay stacking machine. An electric motor 74 powered from tractor 18 drives a pump 76 in communication with a reservoir 78 connected to a relief valve 80 set at 2200 p.s.i. such that this pressure is maintained in each of the cylinders 70 at all times. Two-way operation of the cylinders 70 is possible through the two-way control valve 82. Continuous operation of the motor 74 and pump 76 is avoided by temporary operation occurring at every revolution of platform 28 by operation of a switch actuator 84, as seen in FIG. 18. Thus, if the pressure has fallen below the 2200 p.s.i. level it will be automatically brought back up each revolution of platform 28.

Each power cylinder 70 operatively operates three compression arms 58 through a laterally extending drive shaft 90 having a universal joint 92. Posts 56 are further interconnected by fencing pipes 94 to form a cage for the stack of hay 96. Lower arms 64 carry enlarged trapezoidal pressure plates 100 which assist in shaping stack of hay 96 and applying uniform pressure to it as the stack of hay is being formed. The pressure provided by compression arms 58 on the hay being fed to platform 28 is particularly important in the early forming stages when the hay weight is small in order to maintain the sweeping action of the hay on platform 28, which picks up hay coming from trough 26. As the stack of hay 96 grows and its weight increases the problem is less and the pressure applied by the compression arms 58 becomes less due to the change in length of the lever arm of end portion 72.

As shown in FIG. 3, a plurality of rails 94 are mounted on posts 56 to form a circular cage around platform 28. The cage has two gate sections 104 which can swing outwardly to the dash-line position of FIG. 3 away from the supporting annular frame 42. Rails 94 are pivoted through sleeves 106 slidably and rotatably embracing vertical tubular posts 108. A conventional latch 107 is employed for locking the free ends of the gates 104 together in their closed position.

The push-off arm for the hay stack 96 is best seen in FIGS. 3, 9 and 10 and includes an arcuate member 110 connected at its opposite ends to a pair of drive chains 112 recessed in platform 28. Drive chains 112 are powered by a hydraulic motor 114 connected to a shaft 116 by a sprocket chain 118, as seen in FIG. 9. Thus it is seen that operation of the push-off member 110 moves the member across trough 26 to the rear end of platform 28 whereupon it is then returned to the forward end adjacent annular frame 42 ready for the next push-off operation.

Trough 26 is best seen in FIGS. 3, 11, 12, 16 and 16A and includes a longitudinally extending vertical side wall 120 positioned under a plaform wall portion 122. A bottom wall portion 124 extends from the lower edge of the vertical wall 120 laterally to merge at 126 with the top surface of platform 28, as seen in FIG. 16. The forward end of trough 26 is defined by a forwardly and upwardly extending portion 128 which merges into the top surface of platform 28. A laterally extending slot 130 is formed at the forward end of platform portion 122 and extends to substantially the vertical wall 120, as seen in FIG. 11. Trough 26 is provided with an inlet mouth opening 130 at the outer peripheral edge of platform 28 and this opening is adaped to communicate with a feeding apron 135 which receives a flattened layer of hay from the compressing roller 24, as seen in FIG. 3.

The hay, as seen in FIG. 16, is fed from mouth opening 130 in trough 26 to platform 28 by reciprocal operation of staggered vertical and horizontally oriented feed means 132 and 134, respectively. Feed means 132 includes an elongated frame member 136 along which are spaced U-shaped teeth 138 adapted to extend through the vertical wall 120 utilizing the slots 140 formed in the wall. A pair of crank arms 142 carried on shafts 146 rotate in response to a drive sprocket 144 driven by a hydraulic motor 150. A further crank arm 152 is connected to the shaft 146 and extends in the opposite direction therefrom, as seen in FIG. 11. Crank arm 152 is then connected to an elongated link member 154 for reciprocally operating the feeding means 134 which is 180° out of phase with the feeding means 134.

The forward end of feed means 132 is pivotal about an axis of shaft 156 connected to a link 158 in turn having a tooth 160 with a perpendicularly extending arm 162 pivotally connected thereto at 164. An adjustable rod 166 connects the outer free end of the link 162 to a link 168 connected at the pivot shaft 156. Rod 166 includes and adjustable nut 170 and is adapted to slidably move through an ear 172 such that tooth 160 is free to pivot forwardly when the feeding means 132 is on the out phase of each revolution of crank arm 142 whereby tooth 160 moves under the hay. On the other hand, when feed means 132 is moving forwardly to the left, as seen in FIG. 14, rod 166 limits clockwise pivotal movement of the tooth and thus the hay is moved to the left or forwardly onto platform 28. The other teeth 138 reciprocate in and out of wall 120, as seen in FIGS. 11, 14 and 15, and thus on the out phase of crank 142 revolution the teeth are withdrawn from the trough and on the feeding phase of the revolution the teeth are in the trough as seen in FIGS. 11 and 15 pushing hay onto the platform from the trough, as seen in FIG. 16.

The vertically arranged feeding means 134, as previously indicated, is 180° out of phase and thus when it is on the outtake feeding means 132 is on the intake moving hay forwardly. Feeding means 134 includes a guide channel 180 welded to the bottom wall 124 of the trough 26. An elongated plate member 190 is positioned below the bottom wall 124 in the channel 180 and carries a plurality of spaced apart teeth 192 having forward vertical edges 194 and rearwardly tapering smooth edges 196 such that when teeth 192 are moving forwardly in the trough towards the platform the forward edges 194 grip the hay and move it forwardly but when feeding means 134 is moving to the right or outwardly the smooth edges 196 slide under the hay with no affect thereon.

The power for operating the rake 20, auger 22 and compressing roller 24, is supplied by the power takeoff drive shaft 200 driven by the tractor 18. The power takeoff also drives a pump 202, as seen in FIG. 20, which in turn is connected to a reservoir 204 and relief valve 206 for operation of the unloading power cylinder and rotating cage motors 52 and 54. Feed motor 150 for the feeding means 132 and 134 is also driven by the pump 202 as is the push-off motor 114. The rotating cage motors are operated by a control valve 208 while the valve 210 operates the feed motor 150 and the push-off motor 114 are operated by the valve 212.

Thus it is seen in operation that the tractor 18 pulls the hay sticking machine 10 along picking up hay 220 on the ground through the pickup rake 20 which feeds it to the auger 22 having inwardly directing flights in turn directing the hay then to the compressing roller 24 which feeds it onto the apron 135 adapted to register with the inlet trough opening 130 at the exterior peripheral edge of the table 28. It is seen that this communication is established only when the table 28 is in its loading or transport position of FIG. 1 and is broken when the table is tilted to the unloading position of FIG. 17. The hay continues its travel into the trough 26 where it is fed along the trough by the reciprocating out of phase feed means 132 and 134 in the vertical trough wall 120 and bottom wall 124. Each of these feed means are substantially covered by the platform wall portion 122 which allows the hay in the trough 26 to be fed onto the platform 28 at the forward end of the trough by the hay moving upwardly along the forward trough wall 128, as seen in FIG. 11, and through the laterally extending notch 130 in platform wall portion 122. Notch 130 extends to substantially the vertical trough wall 120. The side of the trough opposite the wall 120 is formed by the merging of the bottom wall 124 with the top surface of platform 28, as seen in FIG. 16. With the hay on the platform 28 the compression arms 58 having portions 60 and 64 extend downwardly onto the hay 74 to compress it against platform 28 and cause it to sweep the hay coming out of the trough 26 up and onto platform 28 thereby building the stack of hay 96 from the bottom up as frame 42 carrying the compression arms 58 rotates about platform 28. The rotation of frame 42 includes the cage of pipes 94. When stack of hay 96 is completed the cage, which has been continuously rotating, is stopped with gates 104 facing the rear over unloading apron 36 and then the unloading cylinders 34 operated to tip platform 28 downwardly at the rear end, as seen in FIG. 17 whereupon the push-off member 110 is operated and moves from the front of platform 28 to the rear taking with it the stack of hay 96. The push-off member 110 is then returned to the forward end of platform 28 ready for the next unloading operation. Platform 28 is returned to its horizontal transport and loading position and the gates 104 are swung closed. The compression arms 58 are again lowered ready to act upon the next hay fed from trough 26 to the center of platform 28. It is seen in FIG. 3 that the inner ends of the upper compression arms 58 all converge at the center of platform 28 which also is at the slot 130 such that the compression arms 58 readily engage the hay and begin the revolution thereof over platform surface 28 as the cage rotates in a counterclockwise fashion.

It is appreciated that positive control is maintained over the feeding of the hay onto platform 28 such that it can be proportioned under the stack and distributed evenly thus causing the stack to grow or rise on an even basis. The stack is formed independently of the operator of the pulling vehicle. The window of hay 220 may pass under any portion of the pickup rake 20 and in any event it will be funneled by the screw conveyor 22 through the restricted passageway through the roller compressor 24 onto the apron 135 and then into the trough 26 through the inlet mouth opening 130. Accordingly, the stack will grow uniformly avoiding tearing action that might otherwise occur and thus maintain its capability of staying intact when the stack of hay is being unloaded.

The embodiments of the invention in which an exclusive property or privilege is claimed are defined as follows:

1. A method of making a stack of hay with a machine having a fixed platform with an upper surface and a space extended from the outer edge to the center area of the platform, said space extended in a longitudinal direction and being of a size to accommodate hay comprising: moving hay into said space from the outer edge of the platform whereby the hay moves in the longitudinal direction of the space, moving the hay from the space onto the upper surface of the platform relative to said upper surface moving the hay on the upper surface of the platform in a circular path to form a stack of hay from the bottom up, applying driving pressure in a downward direction on top portions of the hay on the platform during movement of the hay in said circular path, said pressure on the top portions of the hay being decreased as the height of the stack of hay is increased, and removing the completed stack of hay from the platform.

2. The method of claim 1 including: picking up the hay from a supporting surface and moving the picked up hay to the outer edge of the platform, said hay being then moved in said longitudinal direction toward the center of the platform.

3. The method of claim 1 wherein: said hay is moved into an elongated space located below the upper surface of the platform, said hay being elevated to the level of said upper surface during the movement of the hay in the circular path.

4. The method of claim 3 wherein: said hay is elevated by moving said hay along an upwardly circumferential inclined surface.

5. The method of claim 1 wherein: the hay is moved in the circular path by applying circular force on the outer portions of the stack of hay to rotate the stack of hay about a generally upright axis.

6. The method of claim 1 wherein: the completed stack of hay is removed from the platform by applying a lateral force to a lower portion of the completed stack of hay.

7. The method of claim 1 including: tilting the platform in a downward direction before removing the completed stack of hay from the platform, said completed stack of hay being removed from the platform by moving the completed stack of hay down the tilted platform onto a supporting surface.

8. The method of claim 1 wherein: the hay is continuously moved into the space from the outer edge of the platform.

9. A method of making a stack of hay with a machine having a fixed platform with an upper surface for receiving a supply of hay and supporting a stack of hay comprising: moving hay to the upper surface of the platform, moving the hay on said upper surface of the platform relative to said upper surface in a circular path to form a stack of hay from the bottom up, applying driving pressure in a downward direction on top portions of the hay on the platform during movement of the hay in said circular path on said platform, said pressure on the top portions of the hay being decreased as the height of the stack of hay is increased, and removing the completed stack of hay from the platform.

10. A method of claim 9 wherein: said hay is moved into an elongated space located below the upper surface of the platform, said hay being elevated to the level of said upper surface during the movement of the hay in the circular path.

11. A method of claim 10 wherein: said hay is elevated by moving said hay along an upwardly circumferential inclined surface.

12. A method of claim 9 wherein: the hay is moved in the circular path on the platform by applying circular force on outer portions of the stack of hay to rotate the stack of hay about a generally upright axis.

13. A method of claim 9 wherein: the hay moved to the upper surface of the platform is moved from the outer edge of the platform toward the center of the platform.

14. A method of claim 9 wherein: the hay is continuously moved onto the upper surface of the platform from the outer edge of the platform to the center of the platform.

15. A method of claim 9 wherein: the completed stack of hay is removed from the platform by applying a lateral force to a lower portion of the completed stack of hay whereby the completed stack of hay is laterally removed from said platform.

16. A method of claim 9 including: tilting the platform in a downward direction before removing the completed stack of hay from the platform, said completed stack of hay being removed from the platform by moving the completed stack of hay down the tilted platform onto a supporting surface.

17. Structure for applying pressure to portions of a stack of hay during the forming of the stack of hay comprising: frame means locatable around an area adapted to support a stack of hay, means for rotating the frame means around said area, arm means located over said area adapted to engage upper portions of hay in said area, said arm means moving said hay in a circular path with respect to said area, means movably mounting said arm means on said frame means for pivotal movement about a generally horizontal axis allowing the arm means to move toward and away from said area, and means for biasing said means into engagement with hay in said area to apply pressure to said hay during the forming of a stack of hay in said area.

18. The structure of claim 17 wherein: the arm means comprise a plurality of arms.

19. The structure of claim 18 wherein: the means movably mounting said arm means on said frame means include a plurality of upright posts secured to the frame means, and pivot means pivotally connecting one arm of the arm means to each post.

20. The structure of claim 19 wherein: each arm has an upper arm pivotally connected to the upper end of each post and a lower arm having an outer end pivotally connected to a lower end of each post and an inner end slidably connected to a portion of the upper arm.

21. The structure of claim 20 including: a plate secured to each lower arm, said plate adapted to engage portions of hay for shaping the stack of hay.

22. The structure of claim 17 wherein: the means for biasing said arm means includes a fluid operated cylinder, and means for supplying fluid under pressure to said cylinder.

23. The structure of claim 22 wherein: the means for supplying fluid under pressure to said cylinder includes a pump driven by an electric motor, said pump and motor being mounted on said frame means, and a switch actuator operable to temporarily energize said electric motor at every revolution of the frame means.

24. The structure of claim 17 wherein: said means movably mounting said arm means on said frame means includes pivot means secured to the arm means allowing the arm means to move up and down, and drive means drivably connecting adjacent pivot means, said means for biasing said arm means comprising a fluid operated cylinder connected to one arm and operable to move said one arm and the arms drivably connected to said one arm with the drive means.

25. The structure of claim 17 including: a platform located in said area, said platform having a surface for supporting the stack of hay, and means for supporting the frame means on the platform.

26. Structure for applying pressure to portions of a stack of hay during the forming of the stack of hay comprising: frame means locatable around an area adapted to support a stack of hay, means for rotating the frame means around said area during movement of hay into said ara, arm means located over said area adapted to engage portions of hay in said area, said arm means moving said hay in a circular path relative to said area, means movably mounting said arm means on said frame means allowing the arm means to move toward and away from said area, means for biasing said arm means into engagement with hay in said area to apply pressure to said hay during the forming of a stack of hay in said area, and control means for controlling the pressure of the arm means periodically in response to rotation of the frame means.

27. The structure of claim 26 wherein: the arm means comprise a plurality of arms located around the frame means.

28. The structure of claim 26 wherein: the means for biasing said arm means comprise fluid operated means and means for supplying fluid under pressure to the fluid operated means, said control means operable to temporarily operate the means for supplying fluid under pressure to the fluid operated means.

29. The structure of claim 28 wherein: the control means temporarily operates the means for supplying fluid under pressure to the fluid operated means at least once during every rotation of the frame.

30. The structure of claim 28 wherein: the fluid operated means is a fluid operated piston and cylinder assembly, said means for supplying fluid under pressure comprising a pump and electric motor mounted on the frame, said control means including a switch actuator operable to temporarily energize said electric motor at every revolution of the frame.

31. The structure of claim 26 wherein: said means movably mounting said arm means on said frame means includes pivot means allowing the arm means to move up and down, and drive means drivably connecting adjacent pivot means, said means for biasing the arm means being connected to one arm and operable to move said one arm and the arms drivably connected to said one arm with the drive means.

32. The structure of claim 26 wherein: the means movably mounting said arm means on said frame means include a plurality of upright posts secured to the frame means, and pivot means pivotally connecting an arm to each post.

33. The structure of claim 32 wherein: each arm has an upper arm pivotally connected to the upper end of each post and a lower arm having an outer end pivotally connected to a lower end of each post and an inner end slidably connected to a portion of the upper arm.

34. The structure of claim 33 including: a plate secured to each lower arm, said plate adapted to engage portions of hay for shaping the stack of hay.

35. The structure of claim 26 including: a platform located in said area, said platform having a surface for supporting the stack of hay, and means for supporting the frame means on the platform.

* * * * *

UNITED STATES PATENT AND TRADEMARK OFFICE
CERTIFICATE OF CORRECTION

PATENT NO. : 4,182,097
DATED : January 8, 1980
INVENTOR(S) : Donald L. Henke

It is certified that error appears in the above-identified patent and that said Letters Patent are hereby corrected as shown below:

Column 4, line 44, "adaped" should be --adapted--.

Column 5, line 1, "and" (first occurrence) should be --an--.

Column 5, line 44, "sticking" should be --stacking--.

Column 8, line 60, "ara" should be --area--.

Signed and Sealed this

Fifteenth Day of April 1980

[SEAL]

Attest:

SIDNEY A. DIAMOND

Attesting Officer          Commissioner of Patents and Trademarks